Figure 1:
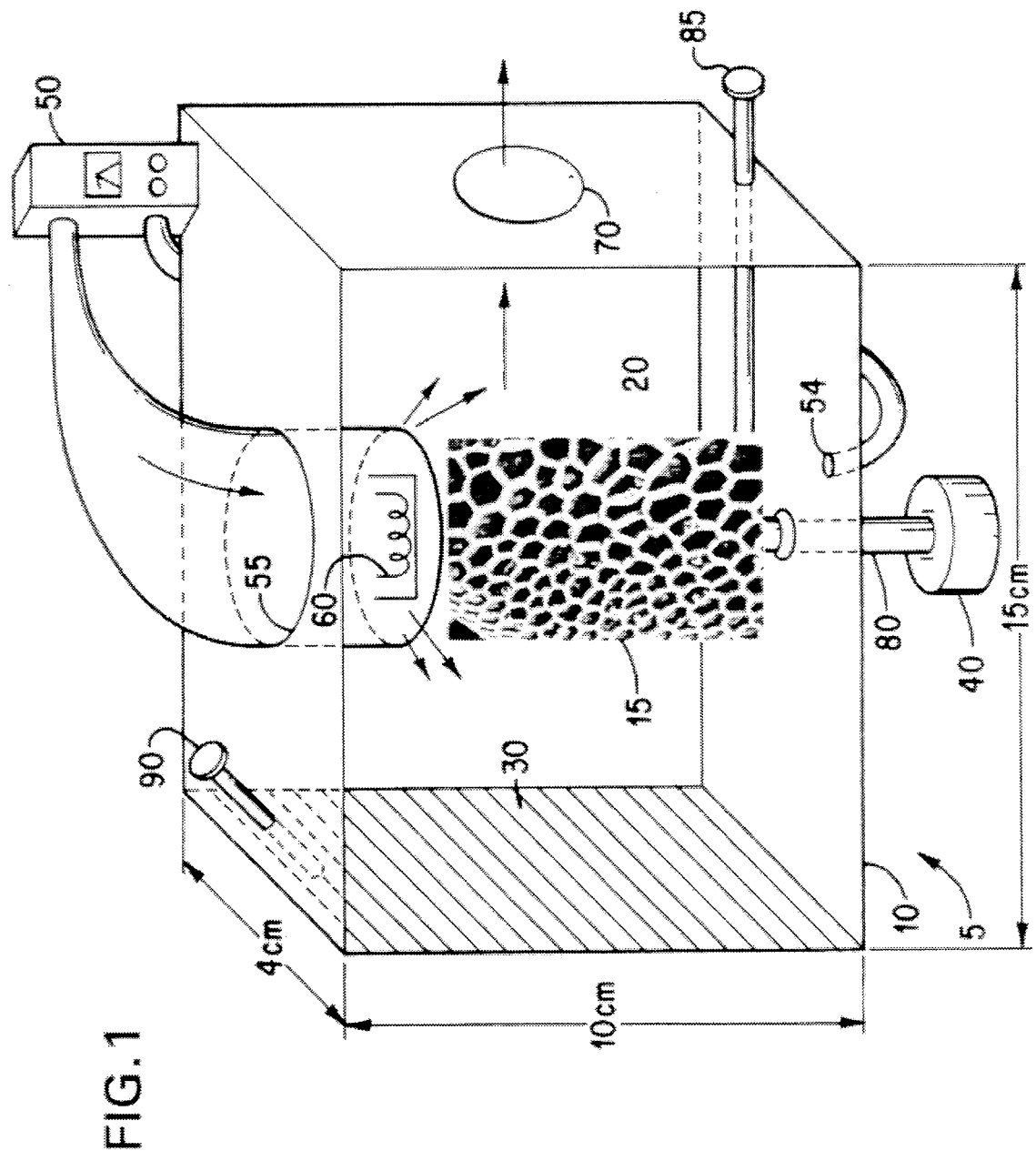
Figure 2A:
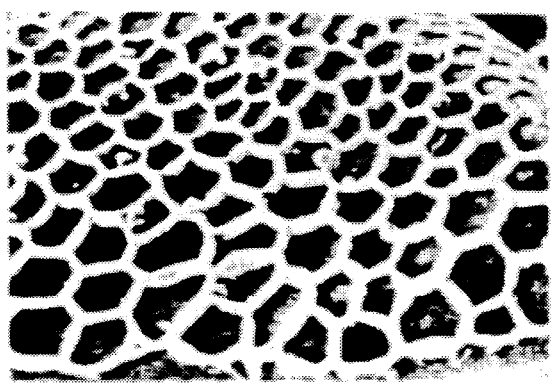
Figure 2B:
Figure 2C:
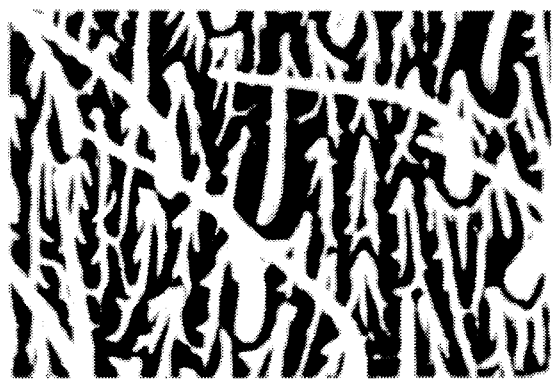
Figure 2D:
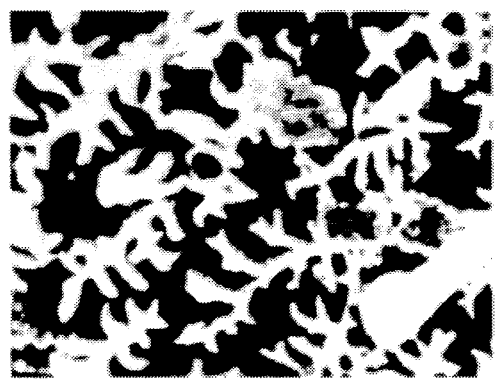
Figure 2E:
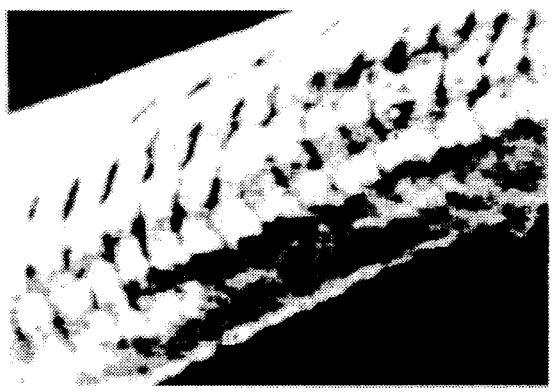
Figure 2F:
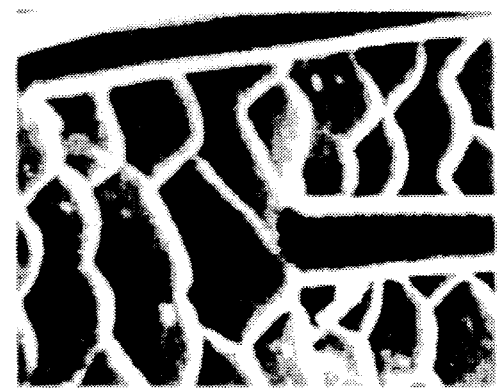
Figure 3:
Figure 4:
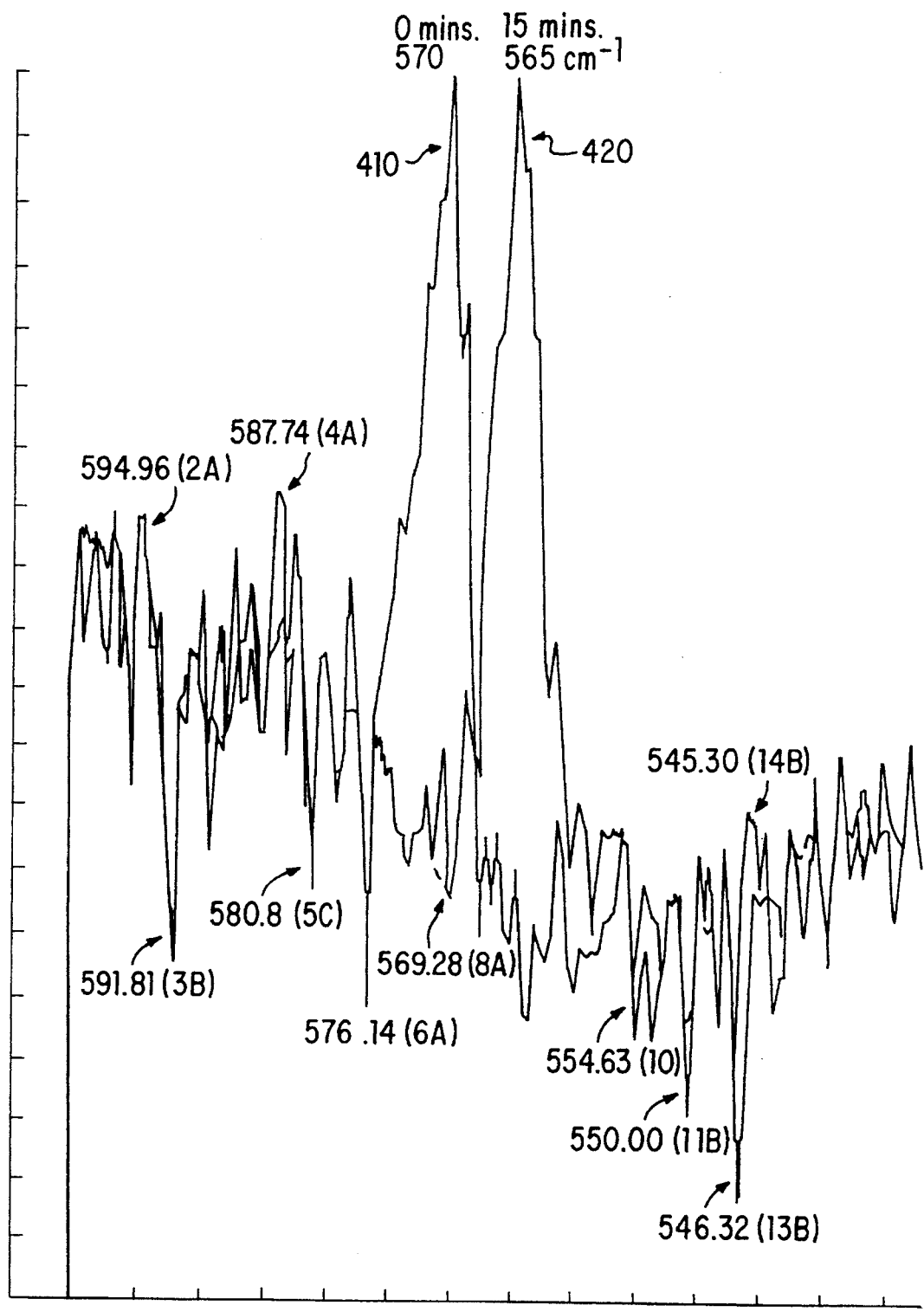
Figure 5:
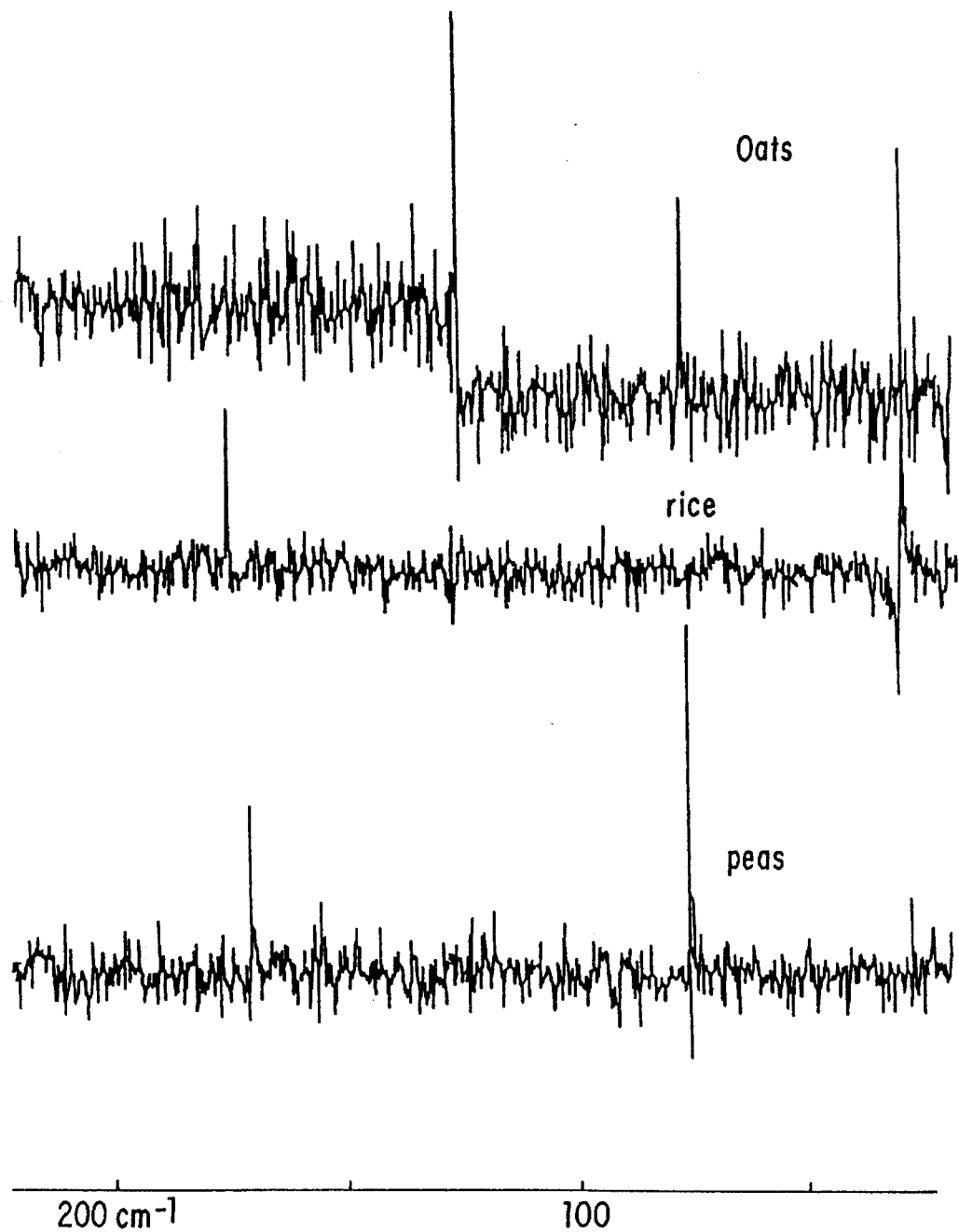

United States Patent [19]
Callahan

[11] Patent Number: 5,528,049
[45] Date of Patent: Jun. 18, 1996

[54] FREQUENCY EMITTER FOR CONTROL OF INSECTS

[75] Inventor: Philip S. Callahan, Gainesville, Fla.

[73] Assignee: Fox Investment Company, Wayne, Pa.

[21] Appl. No.: 405,308

[22] Filed: Mar. 16, 1995

Related U.S. Application Data

[63] Continuation-in-part of Ser. No. 121,368, Sep. 15, 1993, Pat. No. 5,424,551.

[51] Int. Cl.⁶ .................................................. G02B 5/00
[52] U.S. Cl. .................................... 250/493.1; 250/503.1
[58] Field of Search .......................... 250/493.1, 503.1, 250/504 R, 526, 338.1, 341

[56] References Cited

U.S. PATENT DOCUMENTS 3,997,785  12/1976  Callahan .................................. 250/338
4,982,100  1/1991  Harding, Jr. ........................... 250/493.1
5,424,551  6/1995  Callahan .............................. 250/493.1

Primary Examiner—Jack I. Berman
Assistant Examiner—Kiet T. Nguyen
Attorney, Agent, or Firm—Sterne, Kessler, Goldstein & Fox

[57] ABSTRACT

An apparatus and method for controlling insects is provided. In one embodiment, the invention utilizes pumping radiation and molecular vibratory modulation to generate coherent or semi-coherent radiation frequencies to control or attract insects. Such control acting either as an attractant (e.g., for trapping) radiation or a frequency quenching (i.e., jamming) radiation for insects. In a second embodiment, the invention utilizes pumping radiation and a scatter surface to generate coherent or semi-coherent radiation frequencies to control or attract insects.

13 Claims, 11 Drawing Sheets

FREQUENCY EMITTER FOR CONTROL OF INSECTS

This application is a Continuation-in-part of application Ser. No. 08/121,368, filed Sep.15, 1993, now U.S. Pat. No. 5,424,551.

BACKGROUND OF THE INVENTION

1. Field of the Invention

The present invention relates generally to an apparatus and method for controlling or attracting insects and, more particularly, to an apparatus and method for providing a scatter surface and pumping radiation to generate coherent or semi-coherent radiation frequencies to control or attract insects.

2. Discussion of Related Art

Insects such as fleas, mosquitos, moths, etc. are undesirable because they are bothersome, destroy property, and often pose health risks. Devices and methods for trapping, killing, and disposing of insects are well known in the art. These devices and methods have taken many forms and include, for example, fly paper, electric insect killers that kill by electrocution, and chemical pesticides. Conventional devices and methods have many shortcomings. For example, fly paper and electric insect killers are both ineffective at attracting insects, and as such, are only marginally effective (approximately 5–10%) for eliminating insects within a given area. Chemical pesticides are dangerous to both the human population and the environment as a whole. Further, chemical pesticides are also ineffective at attracting insects. It has long been known that insects are attracted to specific molecules of sex and host plant attractants. For example, Dr. Philip S. Callahan (hereinafter Applicant) demonstrated conclusively in 1957 that night flying moths are not attracted to visible light but rather to the infrared scatter frequencies from scents of plants in the air stimulated by the visible light from a low intensity light source. Callahan, "Oviposition Response to the Imago of the Corn Earworm Heliothis Zea (Boddie), to Various Wave Lengths of Light," *Annals of the Entomological Society of America*, Vol. 50, No. 5, September 1957. A summary of scatter radiation can be found in Fabelinskii, *Molecular Scattering of Light*, translated by Robert T. Beyer, Department of Physics, Brown University, Plenum Press, New York, 1968.

In a series of articles in the mid 1960's, Applicant demonstrated that the antennae of insects act as photonic, open resonator waveguides to collect and transmit infrared frequencies. See Callahan, "A High Frequency Dielectric Waveguide on the Antenna of Night-Flying Moths (Saturnidae)," *Applied Optics*, Vol. 7, page 1425, August 1963; Callahan, "Intermediate and Far Infrared Sensing of Nocturnal Insects, Part II, The Compound Eye of the Corn Earworm, Heliothis zea, and Other Moths as a Mosaic Optic-electromagnetic Thermal Radiometer," *Annals of the Entomological Society of America*, Volume 58, Number 5, pp. 746–756, September 1965; and Callahan, "Insect Molecular Bioelectronics: A Theoretical and Experimental Study of Insect Sensillae as Tubular Waveguides, with Particular Emphasis on Their Dielectric and Thermoelectric Properties," *Miscellaneous Publications of the Entomological Society of America*, Volume 5, Number 7, page 315–347, June 1967.

In 1968, Applicant demonstrated the attractance of the mosquito *Aedes aegypti* to human vapor pumped by near infrared radiation in a totally dark environment. See Mangum et al., "Attractance of Near-Infrared Radiation to *Aedes aegypti*," *Journal of Economic Entomology*, Volume 61, Number 1, pp. 36–37, February 1968. This work with insect antennas is described in detail in Callahan, "Insect Antenna with Special Reference to the Mechanism of Scent Detection and the Evolution of the Sensilla," *Int. J. Insect Morphol. & Embryol*, 4(5):381–430 (1975).

In 1977, Applicant demonstrated that attractance of night flying moths to candles is not due to the insect's eye and the candlelight, but is instead due to the insect's dielectric antenna and candle water-vapor infrared emissions to which the insect's antenna is tuned. See Philip S. Callahan, "Moth and candle: the candle flame as a sexual mimic of the coded infrared wavelengths from a moth sex scent (pheromone)", *Applied Optics*, Vol. 16, page 3089, December 1977, and Philip S. Callahan, "Trapping modulation of the far infrared (17- μm region) emission from the cabbage looper moth pheromone (sex cent)," *Applied Optics*, Vol 16, page 3098, December 1977.

For certain insect species, specific attractants (such as "pheromones," which are insect produced volatile compounds) have been chemically identified and synthesized. The isolation of sex and host plant attractant molecules has progressed steadily over the past few decades. Attractants have been utilized in various conventional traps but with poor results since these traps dissipate all of their (pheromone) scent in the air and in only a few days are useless.

In U.S. Pat. No. 3,997,785 to Callahan, which is incorporated by reference herein, Applicant described a system for vibrating a gold coated needle in a molecular scent vapor contained in an enclosed chamber in order to stimulate and emit narrow band maser-like energy from an infrared transmitting window for control of insects. This system, although providing advantages over other conventional solutions, was frequently ineffective because it failed to produce maser-like frequencies that closely mimicked the frequencies produced by the insect being controlled.

There is therefore a need for a device and method that can attract and/or control insects within a specified region, is harmless to the human population, and is relatively inexpensive and easy to operate.

SUMMARY OF THE INVENTION

The present invention overcomes the problems with conventional solutions by utilizing natural (copied) scatter surfaces, natural vibratory modulating frequency, and associated pumping radiation to generate coherent or semi-coherent radiation frequencies to control or attract insects. Thus, the present invention applies to the control of all insects in nature; such control acting either as an attractant radiation (e.g., for trapping) or a frequency quenching (i.e., jamming) radiation for insects.

The present invention provides a method and apparatus for emitting natural millimeter, infrared, visual, UV or UV-X-ray frequencies for control of insects. Control may involve attracting the insects or repelling them. Attractance is achieved by emitting attractance frequencies of the insect to be controlled. Repulsion is achieved by emitting quenching (or jamming) frequencies timed to the photon communication system of the insect, or by emitting out of phase frequencies that interfere with the molecular communication systems of the insects.

These many functions and frequencies are realized with the use of a specially designed frequency (wavelength) emitter which utilizes the natural semiochemicals of a particular insect, and the dielectric scatter surface of the particular insect, to mimic the coded wavelength utilized by the organism in its day to day reproductive and food searching behavior.

The semiochemical or other behavioral molecules are confined in a closed chamber with a window that allows coherent or semi-coherent maser-like radiation frequencies to be emitted. In the center of the chamber is a plate having an etched scatter surface copied from the antenna, thorax, wing or leg of the insect. The plate with the scatter surface is mounted perpendicular to the edge of the window within the chamber. An adjustable grating is also provided to focus the maser-like radiation frequencies for emission through the window. The adjustable grating has a predetermined number of grooves to match the antenna dimensions (dielectric waveguide open resonator) of the appropriate insect. The scatter surface is at a right angle to the adjustable grating and mounted on a vibrating rod with a control to allow the scatter surface to be vibrated in the extremely low frequency range (i.e., between 1 Hz and 800 Hz depending on the insect). The semiochemicals are circulated over the vibrating scatter surface creating coherent or semi-coherent narrow band high intensity maser-like emissions that are emitted to the environment through the window. The coherent or semi-coherent maser-like emissions are used to control, attract, or jam the natural frequencies of insects.

Alternatively, the present invention provides a method and apparatus for emitting photonic waves which emulate natural waves which either attract or repel insects as desired. Emulation is accomplished through the use of a power source, a gas discharge tube, and a scatter surface soaked in an appropriate attractant. In operation, the gas discharge tube is excited by the power supply which results in gas discharge emissions. The scatter surface is mounted adjacent to the gas tube such that the energy resulting from the gas tube discharge is directed onto the scatter surface. This may be accomplished by mounting a cylindrical scatter surface above the gas tube. Attractant molecules attached to (or near) the scatter surface are thereby excited by the discharge energy, and begin to oscillate. When sufficient discharge energy is absorbed, the oscillation produces a photonic wave (or emission). The photonic wave is, in turn, received by the dielectric waveguide(s) of an insect (i.e., the insect's antenna). By varying the discharge energy, the scatter surface, and/or the attractant, the present invention may be "tuned" to achieve effective performance with a wide range of insects.

The energy output from the gas discharge tube may be varied in any of several ways. The gas used to fill the tube may be varied to achieve energy output over a desired spectral range. The energy provided by the power source, used to discharge the gas tube, may be varied both in terms of frequency (i.e., charging rate) and/or amplitude. In addition, the surface of the gas tube may be treated to limit discharge emissions to any desired spectral range.

The scatter surface may also be varied in a number of ways. First, the physical shape of the scatter surface may be varied to enhance ease of construction of the present invention. Next, the spatial relationship of the scatter surface with respect to the gas tube may also be varied to permit direction of the photonic waves in a desired direction. Different substances may be used to construct the scatter surface, resulting in differing degrees of attractant absorption and/or vibration freedom for absorbed attractant molecules.

BRIEF DESCRIPTION OF THE FIGURES

The foregoing and other features and advantages of the invention will be apparent from the following and more particular description of the preferred embodiment of the invention, as illustrated in the accompanying Figures, in which:

FIG. 1 is an illustration of a preferred embodiment of a coherent scatter and group wave soliton waveguide, surface enhanced emitter constructed in accordance with the present invention;

FIG. 2(*a*) through 2(*f*) are photographs showing examples of various scatter surfaces found on the antenna, thorax, and legs of insects;

FIG. 3 is an example of the scatter surface of the antenna of the cabbage looper moth *Trichoplusia ni;*

FIG. 4 is a spectrum of the cabbage looper moth (*Trichoplusia ni*) pheromone;

FIG. 5 illustrates a spectrum scattered off the surface of oats, rice and peas in a small container with their surfaces orientated so that the spectrophotometer beam is illuminated on a flat plane of the outer surfaces of the seeds;

FIGS. 6 illustrates spectrum of formaldehyde flowing across a 3600Å Blacklight UV bulb;

FIG. 7 is a spectrum of the well known $CO_2$ rotation line at 14.9 um;

FIG. 8 is a spectrum of a group soliton atmospheric ELF wave;

FIG. 9 is an illustration of a preferred embodiment of a coherent scatter waveguide constructed in accordance with the present invention;

FIG. 10 is a photomicrograph of a fiberous cardboard multiplicative array utilized as a scatter surface in a preferred embodiment of the present invention;

FIG. 11 is an illustration of a preferred embodiment of a coherent scatter waveguide constructed in accordance with the present invention;

FIG. 12 is an illustration of a preferred embodiment of a coherent scatter waveguide constructed in accordance with the present invention; and FIG. 13 is an illustration of a preferred embodiment of a coherent scatter waveguide constructed in accordance with the present invention.

DETAILED DESCRIPTION OF PREFERRED EMBODIMENTS

I. Operational Overview of a first embodiment

FIG. 1 illustrates a preferred embodiment of the present invention. The present invention comprises a frequency emitter 5 which provides a coherent scatter and group soliton waveguide, surface enhanced emitter for control of insects. This is accomplished by emitting attractance frequencies or conversely by emitting quenching (jamming) frequencies timed to the photon communication system of the insect. These functions are carried out by frequency emitter 5 which utilizes natural semiochemicals of a particular insect and the insect's natural dielectric scatter surface to mimic the coded wavelength utilized by the insect in its day to day reproductive and food searching behavior.

In this document, the term "semiochemicals" is taken to mean any molecule from an insect which naturally emits communication photons. The term "control" is taken to mean the attractance of an insect to a confined area where it can be eliminated (e.g., by electrocution or insecticides) or the repulsion of the insect away from a specified geographic area.

Frequency emitter 5 comprises a chamber 10, a scatter surface 20, an adjustable grating 30, a vibrator/rotor motor 40, an air pump 50, a light pump 60, and an infrared window 70. A functional and operational description of these components is given below. In brief, the frequency emitter 5 generates narrow band high intensity maser-like emissions from semiochemicals contained within chamber 10. The semiochemicals are circulated through the chamber over the scatter surface 20. The pump flow rate (i.e., the rate the semiochemicals are circulated (in a closed system) over scatter surface 20) is set to match wind speeds that stimulate insects to search and respond to the semiochemicals. Scatter surface 20 is vibrated at an appropriate modulation frequency (typically in the extremely low frequency range). By circulating the semiochemicals over vibrating scatter surface 20, maser-like emissions that emulate the natural frequencies generated by an insect can be generated and emitted through window 70 into the environment.

A. Structural Description of the Present Invention

Referring again to FIG. 1, chamber 10 can be any shape, such as a cube, globe, or a parabolic structure. However, the preferred embodiment is a cube measuring approximately 4 cm by 10 cm by 15 cm. In the preferred embodiment, chamber 10 is constructed of metal, plastic, or glass. However, any solid material can be used to construct the chamber 10. Chamber 10 has two holes 54, 55 formed on opposing sides for in and out air flow, respectively.

Chamber 10 is filled with semiochemical molecules or other behavioral molecules, such as pheromones or host plant scent molecules. Chamber 10 is sealed so that the semiochemical (i.e., attractant or quenching) molecules or other behavioral (e.g., scent) molecules can be circulated in a continuous fashion across scatter surface 20. In other words, the frequency emitter 5 is a closed system.

Placed in the center of the chamber 10 is a plate 15 having a scatter surface 20 etched therein. Plate 15 is made from metal or plastic. A micrometer tilt mechanism 85 is provided for adjusting the position of the scatter surface 20 in order to focus or fine tune the narrow band high intensity maser-like emissions (produced by circulating the natural semiochemicals across the natural scatter surface) through the window 70. In a preferred embodiment, scatter surface 20 is adjustable in all directions (e.g., vertically, horizontally, rotationally, pivotally, etc.).

The scatter surface is modeled, for example, after the antenna, thorax, wing or leg scatter surfaces found on all species of insects.

Present day etching technology has reached a state where micrometer dielectric or metal coated forms can be fabricated as scatter surfaces and amplifiers for short wave radiation in the millimeter, microwave, infrared (IR), visible and ultra violet (UV) region of the spectrum. Such miniature open resonator dielectric amplifiers or surface enhanced scatter configurations are now being produced and are described in Jewell et al., "Microlasers," *Scientific America*, November 1991, Scherer et al., "Lasing in Submicron Wide Vertical Cavity Microlasers," *Optics and Photonics News*, December 1991, Grossman et al., "Lithographic spiral antennas at short wavelengths," *Appl. Phy. Lett.*, Vol 59, No. 25, December 1991, and John, "Localization of Light," *Physics Today*, May 1991, which are all incorporated by reference herein in their entirety.

Modern solid state physics is beginning to demonstrate enhanced sensitivity and high amplification of frequencies utilizing array "dots." Such dots are microscopic scatter three dimensional antenna arrays fabricated and etched by holographic lithography onto transistor surfaces. Such etching leaves 3-dimensional landscapes that "trap" and amplify frequencies. See Heitmann et al., "The Spectroscopy of Quantum Arrays," *Physics Today*, June 1993. Insects, for example, have been using such 3-dimensional surfaces for frequency amplification for millions of years.

The technique of atom-probe ion microscopy demonstrates that the imaging of gas atoms that lie above the surface atoms and occupy the more protruding sites are analogous to scatter surfaces of organisms. Such a surface has a rough texture with many tiny projections, or aspirates. A rough surface is not good for imaging, however, unless it is designed with special edges or grooves (such as on an insect) to "focus" the atomic energies. Insects do not have rough surfaces but designed surfaces that enhance frequencies by oscillating surface segregation. Photographs of ions taken with a field ion microscope show soliton target waves in gases such as helium. Such soliton target waves are common at low energies from the atmosphere. See Tien Tsong, "Atom-Probe Field Ion Microscopy," *Physics Today*, May 1993. A soliton wave is a varying wave riding another wave.

Typical types of scatter surfaces for insects are listed in Table 1. FIGS. 2(*a*) through 2(*f*) are photographs showing examples of some of the scatter surfaces listed in Table 1.

TABLE 1

| Table of Natural Surfaces |
|---|
| 1. reticulated (springtails) |
| 2. grooved or ridged (june beetles) |
| 3. brush form (house flies) |
| 4. ridged, cone form (cabbage looper moth) |
| 5. circular group, peg form (aphids (*Myxuces persicae*)) |
| 6. saw tooth form (witch moth (Erebrus)) |
| 7. comb peg form (honeybee) |
| 8. multiple spike form (bird grasshopper) |
| 9. rock crystal form (scale insects) |
| 10. leaf shaped spike form (mosquitoes) |
| 11. knobbed (aphids (*Myzus persicae*)) |
| 12. corn ear surface (tiger moth) |
| 13. small knobbed surface (corn earworm moth) |
| 14. large knobbed surface (Diptera sp.) |
| 15. reticulated knobbed surface (Diptera sp.) |
| 16. air scoop surface (fall armyworm moth) |
| 17. vibrating hair surface (soldier fly) |
| 18. helical corrugated surface (cabbage looper moth) |
| 19. pine cone surface (*Neochetina eichoriniae*) |
| 20. shingled (Brucifidae sp.) |
| 21. ridged uplifted shingled (Hydrophychidae sp.) |
| 22. irregular reticulated (springtails) |
| 23. pit and hill form (ants) |
| 24. elongated reticulated (springtails) |
| 25. loops (Hessian fly) |

FIG. 2(A) shows a reticulated surface (#1, Table 1). FIG. 2(B) shows a grooved or ridged (corrugated) surface (#2, Table 1). FIG. 2(C) shows a ridged, cone form surface as found in the cabbage looper moth (#4, Table 1). FIG. 2(D) shows a leaf shaped spike form surface (#10, Table 1). FIG. 2(E) shows a corn ear surface (#12, Table 1). FIG. 2(F) shows a shingled surface (#20, Table 1). All of these surfaces can be etched into plate 20 using present day micro-etching technology.

The airtight chamber 10 has a special millimeter, infrared, visible, ultra violet, or X-ray window 70 formed therein. Window 70 is used for emission of the scatter coherent radiation (i.e., maser-like emissions) generated by circulating semiochemicals across scatter surface 20 and grating 30 (described below). In a preferred embodiment window 70 is constructed using a Krs 5 infrared window.

The adjustable grating 30 is constructed with the proper number of grooves to generally match the natural dimension of the dielectric scatter antenna or sensilla (spines) of the organism being controlled. The adjustable grating should be gold plated for high reflectance in the visible and infrared region of the light spectrum. For example, the adjustable grating 30 is constructed with 20 groves/mm for cockroaches or 300–600 grooves/mm for small ticks or white flies. A list of typical grating dimensions for different insects is shown in TABLE 2.

TABLE 2

SPECIFICATIONS WITH AVAILABLE GRATINGS

| | Cockroach | Moth | Mosquito | Tick | White Fly | Gnat |
|---|---|---|---|---|---|---|
| Grating (grooves/mm) Wavelength Operating Range | 20 | 75 | 150 | 300 | 600 | 1200 |
| from: | 185 nm | 185 nm | 185 nm | 185 nm | 185 nm | 185 nm |
| to: | 72 µm | 19.2 µm | 9.6 µm | 4.8 µm | 2.4 µm | 1.2 µm |

Adjustable grating 30 is positioned on the side of chamber 10 opposite to window 70. A micrometer tilt mechanism 90 is provided for adjusting the position of grating 30 in order to focus or fine tune the narrow band high intensity maser-like emission through window 70.

In a preferred embodiment of the present invention, the positions of both scatter surface 20 and grating 30 are adjustable (e.g., sideways and up and down) so that they can be positioned to stimulate (and/or focus) natural maser-like emissions. The maser-like emissions are reflected from scatter surface 20 to grating 30. The maser-like emissions are then in turn reflected through window 70. These coherent or semi-coherent maser-like emissions are used to control a specific type of insect in the environment outside frequency emitter 5.

Note, that in a preferred embodiment, after the micrometer adjustments have been made to scatter surface 20 and grating 30 to correspond to a particular insect (e.g. cabbage looper moth), these adjustments can be permanently fixed. Thus, frequency emitter 5 with the semiochemicals contained within (e.g., Z-7-dodecene-1-ol acetate pheromone for the cabbage looper moth) can on site without any further adjustments necessary.

The etched scatter surface 20 is mounted on a vibrating rod 80 perpendicular to the edge of window 70 and at a right angle to grating 30. Vibrating rod 80 is connected to a vibrator/rotor motor 40. Vibrating rod 80 is designed to allow the scatter surface tilt rod 85 to be positioned to screw forward and press against the plate 15. This configuration assures that small angle variations can be made in the surface alignment of scatter surface 20 in relation to grating 30. Once again, grating 30 can also been adjusted using the micrometer tilt mechanism 90.

Vibrator/rotor motor 50 comprises two elements: A low frequency oscillator and a rotor motor (described below). The low frequency oscillator can be controlled to vibrate rod 80 between 1 Hz and 800 Hz (depending on the insect being controlled). Table 3 gives a list of frequency ranges that may be used to control specific insect groups.

TABLE 3

| Insect Group | Frequency Range in cycles per second (CPS) |
|---|---|
| Saturnid moths (Saturniidae) | 8–16 |
| Butterflies (Rhopalocera) | 8–21 |
| Ants (Formicoidea) | 12–20 |
| Dragonflies (Anisoptera) | 20–28 |
| Sphingid moths (Sphingidae) | 26–45 |
| Noctuid moths (Noctuidae) | 35–55 |
| Crane flies (Tipulidae) | 44–73 |
| Lady beetles (Coccinellaidae) | 80–85 |
| Horse flies (Tabanidae) | 96–100 |
| Yellow jackets (Vespidae) | 110–115 |
| March flies (Bibionidae) | 126–140 |
| Bumble bees (Apinae) | 130–140 |
| Fruit flies (Tephritidae) | 150–250 |
| Honey bees (Apinae) | 185–190 |
| Mosquitoes (Culicidae) | 160–500 |

Air circulating pump 50 is provided to allow the semiochemical or other attractant or quenching molecules to be circulated across the vibrating scatter surface. Note that the chamber 10 is initially filled with the semiochemical or other attractant or quenching molecules before turning on the air circulating pump 50. The air flow is adjusted so that it mimics the air flow to which insects respond. That is, semiochemicals blowing at certain speeds through the air stimulate insects to search and respond to the chemicals. Thus, the semiochemical molecular flow is adjusted to match the natural air flow of airborne molecules that stimulate insects. In a preferred embodiment, the air flows from the top edge of scatter surface 20 to air pump 50 via opening 55, and is returned to chamber 10 through opening 54. A light pump 60 is mounted directly above scatter surface 20. Light pump 60 can be any infrared, blue, ultra violet or UV-X-ray light source. An ultra violet (3600 Å) light source is used in a preferred embodiment. Light pump allows low intensity pumping radiation (DC) to be directed across scatter surface 20. Light pump 60 can be constructed in a number of different ways, such as: (1) DC filament source placed behind a filter (e.g., a color filter, infrared filter, UV filter etc.); (2) a light emitting diode of proper frequency (e.g., millimeter, infrared, light, UV or UV-X-ray); (3) a flickering light source (1 to 800 or more Hz) in which case the scatter surface 20 can be adjusted to synchronize with the flicker of the light pump 60; or (4) an etched grating light source which reflects a defined frequency from its surface and across scatter surface 20.

If the present invention is used to control insects in a large area, yard, field etc., frequency emitter 5 can be rotated 360° around a vertical axis using vibrator/rotor motor 40. This allows frequency emitter 5 to sweep the emitted radiation from window 70 across the large area. The rotation is accomplished simultaneously with the vibration. Given this configuration, the present invention is particularly adaptable to be used in a storage grain elevator, for example. Note that the frequency emitter 5 does not need a rotor motor to operate correctly. To operate correctly only a low frequency oscillator is required.

B. Tuning the Frequency Emitter 5

Described below are a number of physical-chemical parameters involved in tuning frequency emitter 5 for a particular insect (e.g., cabbage looper moth). In order for the frequency emitter 5 to operate effectively one or more of these parameters may be involved. For example, the wrong temperature or the wrong concentration of the semiochemical may shift the emission out of "tune" diminishing the benefits of the present invention.

Temperature affects the wavelength of the maser-like emissions emitted from frequency emitter 5. As such, changing the temperature within the frequency emitter 5 can increase or decrease the performance of the present invention. Generally, the frequency emitter should be operated between 30° to 120° F. Higher temperatures produce longer wavelengths and lower temperatures produce shorter wavelengths in the maser-like emissions.

A higher concentration of semiochemicals produces longer wavelengths and a lower concentration of semiochemicals produces shorter wavelengths in the maser-like emissions.

Modulating the scatter surface at different frequencies can change the harmonics of the maser-like emissions. A higher modulating frequency results in the harmonics being farther apart, while a lower modulating frequency results in the harmonics being closer together.

Experiments in the field have demonstrated that semiochemicals blowing at certain speeds through the air stimulate insects to search and respond to the chemicals. If the velocity (measured in miles per hour (MPH)) is too low or too high the molecules do not collide and vibrate with the insects scatter surface at the frequency to which the insect naturally responds. The efficiency of frequency emitter 5 can therefore be increased by changing the flowrate that the semiochemicals are circulated through chamber 10. Experiments have shown that efficiency has increased by changing the flowrate from 0.1 to 0.8 MPH.

Insects fly at different times of night and day. Since the environmental radiation (pumping radiation) often changes due to overcast or haze etc., the color and intensity of light may change from good to bad or vice versa. By changing the wavelength of the pumping radiation (i.e., changing the type of light pump 60) the amplitude of the maser-like emissions can also be altered to correspond to a particular insect.

It is important that the circulating molecules be of the correct degree of freedom (i.e., not to close together or to far apart) to assure coherent emission at vibrating scatter surface 20. The emissions should be directed at a right angle against grating 30 and reflected out of window 70. Nitrogen may be added to the molecular semiochemical (by experimentation) in order to provide a carrier for the emitting molecules and to obtain the correct degrees of freedom in the diluted vapor.

As seen from above, fine tuning the frequency emitter 5 can be a challenging process which includes experimentation within the natural environment of the insect. Along with the above techniques, Table 4 provides a number of other factors that should be considered when operating the present invention.

TABLE 4

1. Efficiency can be increased by applying an electret effect (plus and minus charge). The electret effect can be obtained from a purchased teflon electret, or made by placing a teflon sheet between two plates at 2000 volts and slightly heating the sheet. An electret effect orients molecules. If the molecules form a single layer it is referred to as a "monolayer effect."
3. Semiochemical concentration increase can broaden the frequency line.
4. Adding $(CH)_{2n}$ in the semiochemical chain can produce a shift in the frequency line.
5. Frequency emissions not only occur in large windows (2, 5, 7, to 14 Um), but also in micro (e.g., narrow) windows between the water rotation absorption bands. However, the frequency emissions will be quenched if they coincide with the water rotation absorption bands.
6. Doping by adding extra $(CH)_{2n}$ or $(CH)_{3n}$ shift or quenches frequencies.

TABLE 4-continued

7. Doping with minute amounts of ammonia $(NH)_3$ can increase efficiency (i.e., the ammonia acts as a catalytic agent).
8. Medium to weak primary wavelength sidebands are typically associated with strong emissions. Adjusting the wavelength of the sidebands can oftentimes produce better results. For example, an insect might be more inclined to be tuned into the stronger wavelengths of the sidebands.

The teachings of the present invention can also be extended to a photonic waveguide integrated diode circuit having etched scatter surface contained therein. The diode can be used to control insects since present day technology makes it feasible to reduce this entire scatter biological control chamber to a single emitting diode.

C. Examples As shown in FIGS. 3 through 14, emissions from insect semiochemicals (pheromone, plant seed, formaldehyde and $CO_2$, respectively) can be stimulated to emit narrow band maser-like signature frequencies by blowing them across a natural scatter surface. These semiochemicals are modulated with the same frequencies that the insect vibrates its antenna, as shown in Table 3. Given below are a few examples of the type of insects that can be controlled with the present invention.

1. *Trichoplusia ni*

FIG. 3 is an example of the scatter surface of the antenna of the cabbage looper moth *Trichoplusia ni.* The sensilla (pheromone sensors) dielectric waveguide spines can be seen protruding between the ridged cones of the scatter surface. The dielectric waveguide sensilla (spines) themselves have corrugated scatter surfaces. To control the cabbage looper moth, scatter surface 20 would be modeled after this surface.

FIG. 4 is a spectrum of the cabbage looper moth pheromone Z-7-dodecene- 1-ol acetate. Chamber 10 is filled with this semiochemical molecule and pumped by blue light via light pump 60. Since 55 Hz is the antenna vibration frequency of the cabbage looper moth, scatter surface 20 located within chamber 10 is vibrated at this frequency. A 17 μm water vapor microwindow is used. Water vapor (e.g., 2A, 3B, 4A, 5C, etc.) and pheromone emission lines 410 and 420 are designated. Pheromone emissions 410 and 420 frequencies shift from 570 μm to 565 μm over a 15 minute period, respectively, due to deliberate heating in chamber 10 (i.e., temperature tuning). Concentration tuning is also evident by changing the amount of the pheromone.

2. *Plodia interpunctella*

The Indian Meal moth (*Plodia interpunctella*) destroys millions of dollars of stored grain each year all over the world. Typically grains include oats, rice, and peas. FIG. 5 is a spectrum scattered off the surface of the seeds of oats, rice and peas in a small container with their surfaces orientated so that a spectrophotometer beam illuminated the flat plane of the outer surfaces of the seeds. The scent outgassing from the surface of each group of plant seeds shows a group of narrowband coded emissions (like a bar code). These nonlinear maser-like emissions represent acoustic Stokes Brillioiun and Raman scatter from the outgassing plant scents. In order to control the Indian Meal moth, chamber 10 is filled with one of the semiochemicals shown in FIG. 5.

Scatter surface 20 is modeled after the antenna surface of the Indian Meal moth (shown in FIG. 2F), and modulated at 30 Hz (i.e., the modulation frequency of the antenna of the Indian Meal Moth) to produce narrow band maser-like emissions. These emissions emitted through window 70 can be used to control (and consequently eliminate within a given area) the Indian Meal moth.

3. *Plecice nearctia*

Figure 6:
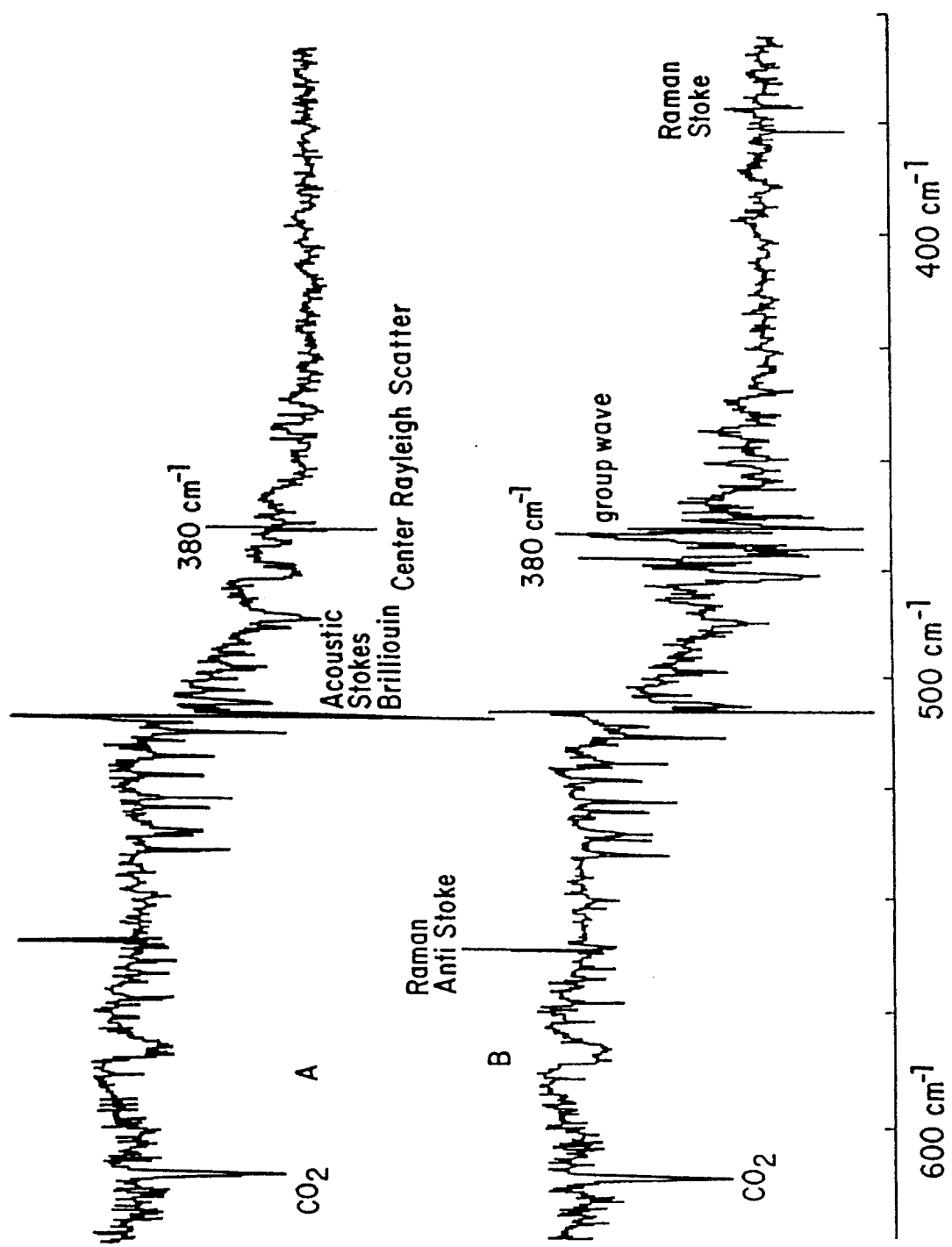
Figure 7:
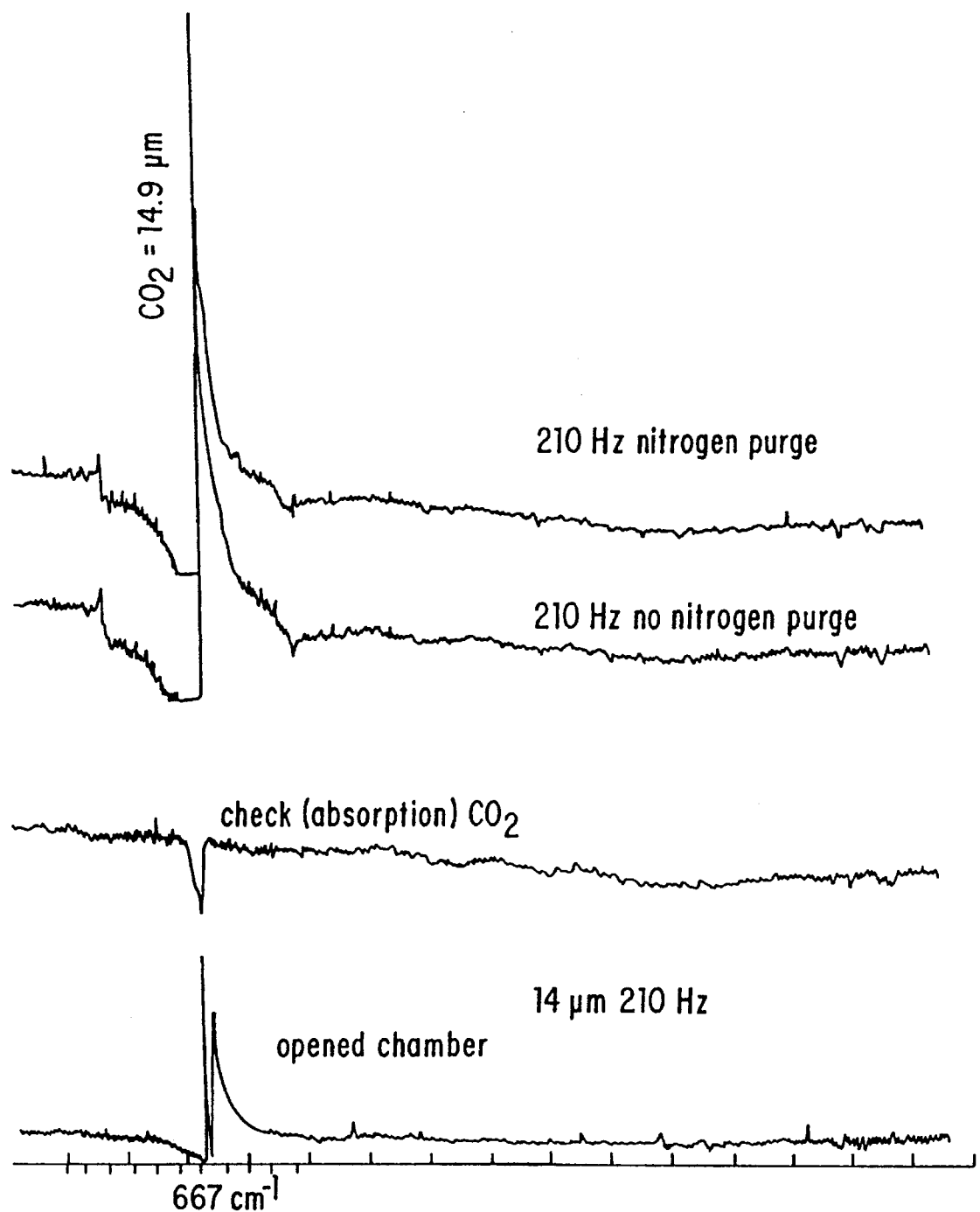
Figure 8:
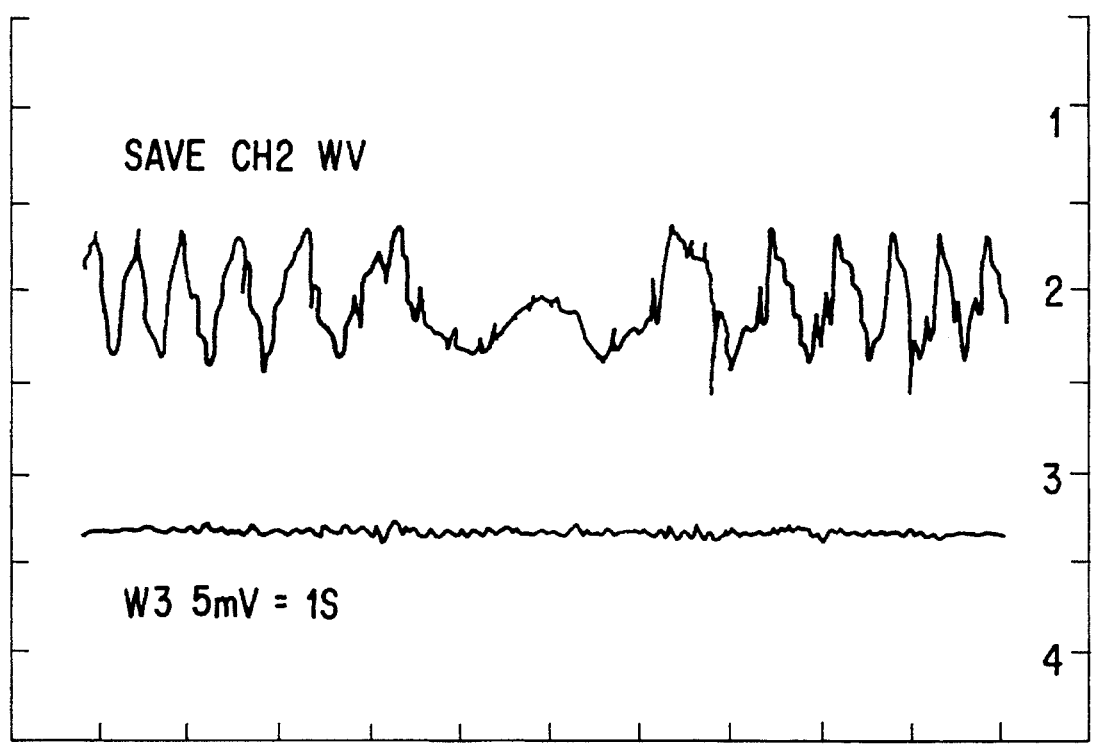

FIG. 6 is a spectrum of formaldehyde flowing across a 3600 Å Blacklight UV bulb. Formaldehyde is a powerful attractant to the Love bug (*Plecice nearctia*), a nuisance insect that is attracted to highways by the aldehydes in exhaust fumes.

Spectrum A is a scan with the formaldehyde modulated at 130 Hz (i.e., the antenna vibration frequency of the lovebug antenna). Spectrum B is formaldehyde also modulated at 130 Hz but with the vapor blowing at high speed (10 mph) across the interferometer infrared beam. The pumping radiation is still 3600 ÅUV. The Rayleigh center scatter line which is narrowband (maser-like) at 38 $Ocm^{-1}$ becomes a group wave with a Gaussian distribution at fast air speeds. Such group waves can be utilized to amplify or quench the organisms semiochemical communication systems.

4. Mosquitoes

FIG. 7 is a spectrum of the well known $CO_2$ rotation line at 14.9 μm. This line can be stimulated to emit very strongly the vibration frequency of many species of mosquitoes, stable, and horse flies by modulating it at 210 Hz. Emission is stimulated by a slight nitrogen purge, a gentle breeze, and the 210 Hz modulated frequency. Addition of a trace of lactic acid causes slight amplification and more signals to emerge in this region. Many insects that attack animals are attracted to $CO_2$-lactic acid. The pumping radiation is near infrared in the 1 & 2 μm region.

D. Detection of Emissions of Frequency Emitter 5

The frequency and or harmonics emitted from frequency emitter 5 may be detected by a high resolution Fourier analysis interferometer spectrophometer (not shown). In a preferred embodiment, the maser-like emissions can be detected by the apparatus described in a U.S. Pat. application Ser. No. 08/047,486, filed Apr. 19, 1993, entitled "Photonic Ionic Cord Detector of Group Waves," by inventor Philip S. Callahan. The '486 patent application is hereby incorporated by reference in its entirety.

FIG. 8 is an oscilloscope recording of a group soliton atmospheric ELF wave useful for modulating molecular scatter radiation and discovered by the Applicant on trees and human skin surfaces. Such group soliton waves are also observed as stimulated emission from insect semiochemicals attractants (e.g., FIG. 6), and are a part of the control configuration of such emissions for biological organisms. That is, the group soliton wave is a universal frequency that can be used to control insects. Although experimentation may indicate that other frequencies are more suited for a particular insect the group soliton wave has been shown in experiments by Applicant to control a wide range of insects.

Conversely, frequency emitter 5 can be adapted to emit a gaussian distributed scatter group wave to quench (jam) an attractant or unwanted frequency.

II. Operational Overview of Another Embodiment

FIG. 9 illustrates another embodiment of the present invention. In this embodiment, the present invention comprises a discharge gas tube 910, a strobe circuit 920, a condenser 930, a tube shield 940, a scatter surface 950, and supports 960. In operation, the discharge from gas tube 910 provides pumping radiation which is directed onto scatter surface 950. Gas tube 910 may be any radiation or light source capable of producing a discharge output covering a desired spectral range (i.e., that portion of environmental radiation spectrum to which the insect to be controlled is naturally sensitive). Gas tube 910 is preferably a Radio Shack Xenon Strobe Part No. 61-2506. The gas contained within gas tube 910 is therefore selected to ensure that the characteristic pumping frequency of the insect to be controlled is generated. Strobe circuit 920 and condenser 930 provide the energy required to excite gas tube 910, as well as control the duration of each strobe and the time interval between strobes. Tube shield 940 protects gas tube 910 from shock, and may also be treated to limit transmission of only selected frequencies (spectral energies) upon discharge of gas tube 910.

Scatter surface 950 is exposed to semiochemicals or any suitable attractant or quenchant molecules (hereafter "attractant"), and provides a medium for excitation of the attractant. Scatter surface 950 is preferably soaked in attractant, and thereby retains attractant molecules through adhesive and/or cohesive bonding forces. By varying the material and/or construction of scatter surface 950, the present invention may be further tuned to accommodate various insects. Supports 960 suspend scatter surface 950 above gas tube 910 so as to permit discharge radiation to excite attractant molecules on (or near) scatter surface 950. Power for strobe circuit 920 may be derived from any suitable power source, including DC batteries contained within strobe circuit 920, an external DC source (not shown), or an external AC source (not shown).

A. The Pumping Mechanism

As stated above, the present invention controls insects by exciting attractant molecules at characteristic frequencies associated with various insects. The excited molecules, in turn, emit a maser-like photonic wave which is sensed by nearby insects and which may have an attractive or a repellant effect (depending on whether a semiochemical, attractant, or quenchant is used). The effectiveness of the present invention therefore derives directly from the coherency and/or intensity of these maser-like photonic emissions. By varying different parameters of the invention, the photonic emissions may be tuned to optimize the performance of the invention.

Towards this end, several of the parameters that may be varied are discussed in detail below. First, discharge gas tube 910 is considered. As shown in FIG. 9, gas tube 910 provides the excitation energy used to directly excite the attractant molecules. By controlling the spectral output of gas tube 910, excitation of the attractant molecules may be increased within any desired spectral region. Several methods are preferred for accomplishing this.

First, the gas contained in gas tube 910 may be selected to provide discharge energy within a particular spectral range. For example, Xenon gas is ideally suited for attracting mosquitos because of its strong discharge emission within the frequency range to which mosquitos are especially sensitive (Near-IR). In addition, tube shield 940 may be treated to limit the emissions from the discharge of gas tube 910 to any spectral range(s) of interest. For example, by coating tube shield 940 with an IR passing filter, the relative intensity of molecular excitation in the desired IR energy band is increased. In addition, any flash or glare that may be annoying to humans is eliminated.

Next, additional variation of the gas discharge excitation energy may be achieved by varying the intensity and/or pulse rate of the discharge of gas tube 910. Gas tube 910 is discharged when the energy stored on condenser 930, supplied from strobe circuit 920, is sufficient to excite the gas. By varying the size of condenser 930, the stored energy (which is ultimately dissipated by the "strobe" of gas tube 910) may be varied. In addition, the time interval between "strobes" may be controlled by varying the charge rate of strobe circuit 920. Experimentation has demonstrated that good results are achieved when the delay interval between strobe bursts is in the range of about 1 second to 30 seconds, depending in part on ambient conditions. As will be immediately recognized by one skilled in the art, the size of condenser 930 as well as the charging rate of strobe circuit 920 may be varied to control the strobing of gas tube 910.

B. The Scatter Surface

Figure 11:
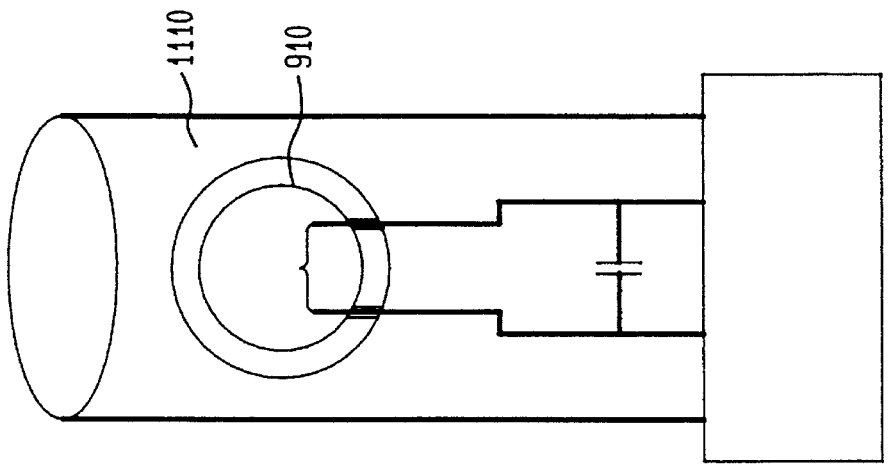
Figure 13:
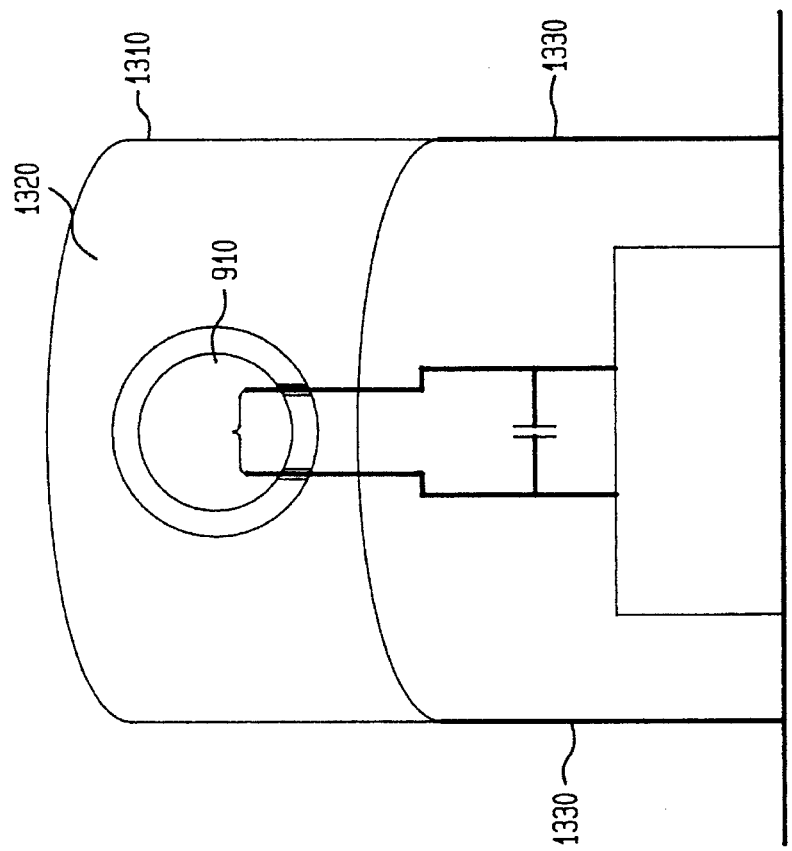
Figure 12:
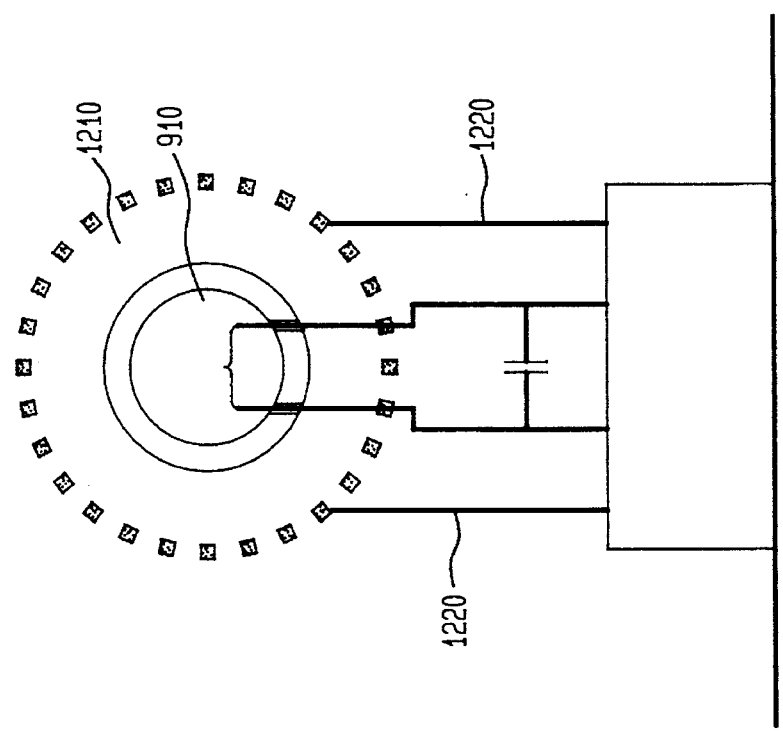

Beyond the spectral discharge, the effectiveness of the present invention is also directly dependent on the construction of the scatter surface which is used to support generation of the maser-like photonic waves. Referring again to FIG. 9, scatter surface 950 is shown supported above gas tube 910. While this orientation is useful to permit convenient orientation of the constituent parts of the invention, any number of alternative arrangements are possible. FIGS. 11, 12, and 13 represent other preferred arrangements, which are discussed more fully below. The common requirement among these preferred arrangements is that the discharge energy from gas tube 910 is able to interact with the attractant on and/or around the scatter surface.

Figure 9:
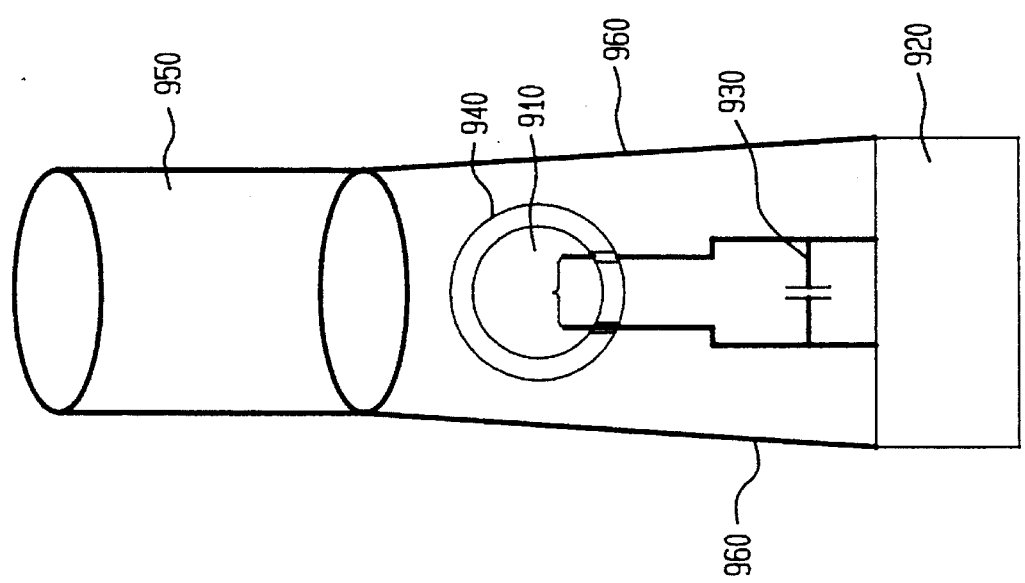
Figure 10:
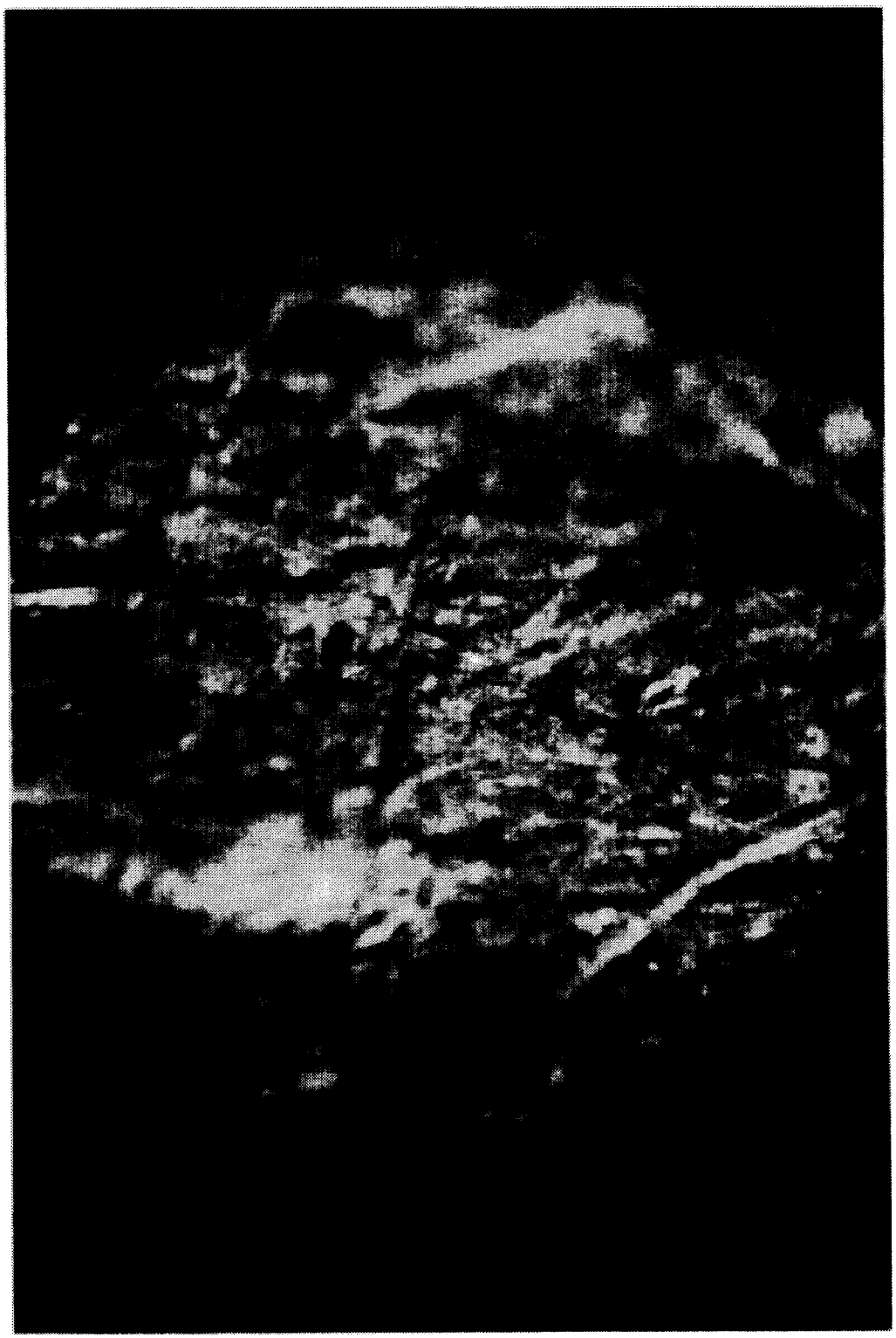

In FIG. 9, scatter surface 950 is preferably a ⅛ inch thick cardboard roll, approximately 4 cm in diameter and approximately 8 cm in height. The cardboard roll is soaked in attractant before it is exposed to the discharge radiation from gas tube 910. FIG. 10, a high magnification closeup of scatter surface 950, shows the multiplicative array 1010 formed by the cardboard material. When soaked in attractant and then exposed to discharge radiation, molecules of the attractant on (and suspended near) the multiplicative array 1010 are excited and emit maser-like photonic waves. The intensity and coherency of these waves, dependent in part on the discharge radiation, is also influenced by the geometry of the scatter surface. Cardboard has been shown to work well, in part because of the degree of vibrational freedom afforded to attached attractant molecules as well as due to the porosity of the material (which can therefore hold many molecules of attractant).

As stated above, other scatter surface configurations may be employed to vary the coherency and/or intensity of emitted maser-like photonic waves. Almost any scatter surface configuration may be utilized, subject to the requirement that the surface selected be able to support molecules of attractant with some degree of vibrational freedom. For example, FIG. 11 depicts a configuration where gas tube discharge source 910 is essentially surrounded by the scatter surface 1110. In this configuration, scatter surface 1110 must be sufficiently porous to allow the discharge energy from gas tube 910 to excite attractant molecules on scatter surface 1110. Similarly, FIG. 12 depicts a scatter surface 1210 essentially encasing gas tube 910. Like scatter surface 1110, scatter surface 1210 must permit discharge energy from gas tube 910 to excite attached attractant molecules. Supports 1220 are used to position scatter surface 1210 near gas tube 910, as detailed above. Referring to FIG. 13, a configuration particularly suitable for varying photonic coherency is presented. Scatter surface 1310 is curved, only partially surrounding gas tube 910, so as to focus emitted photonic waves in a desired direction. Supports 1330 are used to position scatter surface 1310 in any desired orientation. Furthermore, the radiant surface 1320 of scatter surface 1310 may be covered with velcro, or a similar material. The velcro "hooks" or "loops" provide both desired attractant retention as well as vibrational freedom in such a fashion as to align the molecular vibration of the attractant molecules. A focussing effect is therefore realized, producing increased intensity and coherency of the emitted maser-like photonic waves.

C. The Attractant

As stated above, the scatter surface of the present invention must be soaked in (or treated with) a suitable semiochemical, attractant or quenchant. The particular solution used depends on the insect to be controlled. For example, excellent results were achieved in mosquito attracting tests when the attractant used was a saline solution which approximated human sweat. A preferred composition for this saline solution is presented in Table 5 (below).

TABLE 5

Saline Attractant

| Material (Chemical Symbol) | Content (%) |
|---|---|
| Sodium (Na) | 10.7 |
| Chlorine ($Cl^{-1}$) | 19.7 |
| Bicarbonate ($HCO_{-3}$) | 1.4 |
| Magnesium (Mg) | 1.2 |
| Potassium (K) | 0.4 |
| Calcium ($Ca^{++}$) | 0.4 |

III. Conclusion

An apparatus has been disclosed for generating coherent or semi-coherent radiation frequencies to control or attract insects. While the invention has been particularly shown and described with reference to preferred embodiments thereof, it will be understood by those skilled in the art that the foregoing and other changes in form and details may be made therein without departing from the spirit and scope of the invention.

What is claimed is:

1. A coherent scatter waveguide for generating photonic emissions for control of an insect, comprising:

(a) a scatter surface;

(b) an attractant, disposed on said scatter surface, selected according to the insect to be controlled;

(c) a strobe circuit; and (c) a pumping radiation source, connected to said strobe circuit, positioned so as to direct pumping radiation onto a molecule of said attractant, thereby exciting said molecule of said attractant to further cause emission of a photonic wave used to control the insect.

2. The coherent scatter waveguide of claim 1, wherein the scatter surface further comprises a multiplicative fiber array.

3. The coherent scatter waveguide of claim 2, wherein the multiplicative fiber array is a piece of cardboard.

4. The coherent scatter waveguide of claim 1, wherein the scatter surface further comprises a semi-circular surface positioned to focus the emitted photonic wave in a desired direction.

5. The coherent scatter waveguide of claim 1, wherein the scatter surface further comprises a spherical surface positioned to disperse the emitted photonic wave uniformly over a radial distribution.

6. The coherent scatter waveguide of claim 1, wherein the scatter surface is further constructed using a material having a plurality of protrusions supported in such a manner so as to direct the emitted photonic wave in a desired direction.

7. The coherent scatter waveguide of claim 1, wherein said attractant is a saline solution.

8. The coherent scatter waveguide of claim 1, wherein the strobe circuit further comprises a condenser, electrically connected in parallel between the outputs of said strobe circuit and the inputs of said pumping radiation source.

9. The coherent scatter waveguide of claim 1, wherein the pumping radiation source is a gas discharge tube.

10. The gas discharge tube of claim 9, wherein said gas discharge tube is filled with Xenon.

11. The gas discharge tube of claim 9, wherein said gas discharge tube is treated with an IR passing filter so as to limit the output of the tube to desired frequencies.

12. A method for controlling insects through emission of photonic waves, comprising the steps of:

(a) generating pumping radiation, said radiation covering a characteristic frequency of an insect; and (b) exposing an attractant provided on a scatter surface to said pumping radiation to permit molecules of said attractant to vibrate and thereby to emit a photonic wave which is received by the insect and which further attracts or repels the insect.

13. The method of claim 12, wherein the step of generating pumping radiation further comprises generating pumping radiation within a selective energy range, said energy range corresponding to a sensitivity range for the insect to be controlled.

* * * * *